United States Patent [19]

Suominen et al.

[11] Patent Number: 5,140,952
[45] Date of Patent: Aug. 25, 1992

[54] METHOD OF AND APPARATUS FOR IMPROVING THE OPERATION OF AN ENGINE

[76] Inventors: Lauri Suominen; Brita Suominen, both of SF-29250 Nakkila, Finland

[21] Appl. No.: 601,735
[22] PCT Filed: May 6, 1988
[86] PCT No.: PCT/FI88/00070
 § 371 Date: Oct. 31, 1990
 § 102(e) Date: Oct. 31, 1990
[87] PCT Pub. No.: WO89/11026
 PCT Pub. Date: Nov. 16, 1989
[51] Int. Cl.⁵ .......................................... F02M 35/10
[52] U.S. Cl. ................... 123/52 M; 123/306; 123/430; 123/76
[58] Field of Search ............ 123/308, 306, 430, 76, 123/52 M

[56] References Cited

U.S. PATENT DOCUMENTS

| | | | |
|---|---|---|---|
| 2,714,374 | 8/1955 | Hennig | 123/76 |
| 2,940,432 | 6/1960 | Hijszeler | 123/76 |
| 3,046,960 | 7/1962 | Dolza | 123/76 |
| 3,318,292 | 5/1967 | Hideg | 123/306 |
| 3,976,039 | 8/1976 | Henault | 123/26 |
| 4,064,849 | 12/1977 | Nagasawa | 123/430 |
| 4,104,989 | 8/1978 | Resler | 123/430 |
| 4,106,439 | 8/1978 | Kanao | 123/430 |
| 4,217,866 | 8/1980 | Nakajima | 123/76 |
| 4,232,641 | 11/1980 | Custil | 123/76 |
| 4,271,800 | 6/1981 | Borracci | 123/430 |
| 4,515,127 | 5/1985 | Katsuoka | 123/430 |
| 4,809,649 | 3/1989 | Brinkman | 123/76 |

FOREIGN PATENT DOCUMENTS 1920751 11/1970 Fed. Rep. of Germany .
58-5423 1/1983 Japan .

Primary Examiner—David A. Okonsky
Attorney, Agent, or Firm—Pollock, Vande Sande & Priddy

[57] ABSTRACT

A method for improving the operation of an engine including a cylinder space, a piston movable therein, at least one inlet valve having an inlet duct associated therewith, and at least one outlet valve having an outlet duct associated therewith includes providing an air filling in the inlet duct upstream of the inlet valve(s). An initial portion of the air filling is introduced into the cylinder space while the outlet valve(s) is open, whereby the initial portion of air filling flushes the cylinder space and exits into the outlet duct through the open outlet valve(s). Upon closing of the outlet valve(s) the introduction of the air filling into the cylinder space is continued and thereafter an air-and-fuel mixture is brought into the cylinder space through the same inlet duct(s) and inlet valve(s) through which the air filling has passed in being introduced into the cylinder, resulting in a fuel charge stratified a top of the retained air filling.

16 Claims, 10 Drawing Sheets

METHOD OF AND APPARATUS FOR IMPROVING THE OPERATION OF AN ENGINE

FIELD OF THE INVENTION

The present invention relates to a method of improving the operation of an engine and to an apparatus for carrying out the method.

BACKGROUND OF THE INVENTION

A drawback with engines used at present is that some of the gases already burned during the preceding power stroke remain in the cylinder space, which is liable to impair efficiency since there is no combustion of gases already burned. Furthermore, during the flushing of a cylinder space, some of the fuel-and-air mixture may find its way into the exhaust manifold which causes an increase in the consumption of fuel.

One solution for improving the operation of an internal combustion engine is disclosed in the publication DE-OS 19 20 751. This publication describes an apparatus for preventing the passage of fuel-and-air mixture through the outlet valve into the outlet duct during an induction stroke. The apparatus includes an air pipe, which is fitted in the intake manifold and from which branches an air duct to the base of each inlet valve. The air issuing from this air duct provides a flushing effect as the inlet valve and outlet valve are simultaneously open. However, the apparatus disclosed in the above publication is constructionally unreliable in providing a satisfactory flushing action. In addition, the cited publication does not take into consideration all possiblities for the operation of an engine achieved by means of air filling or the like.

The following is a list of the most essential features in terms of the operation of an engine for the passage of fuel-air-air-mixture:

The burned gases must be removed as thoroughly as possible from the cylinder space prior to passing a fuel-and-air mixture into the cylinder space during the flushing no fuel-and-air mixture can be allowed to pass into the exhaust pipe, filling of the cylinder space must be as complete as possible regardless of the running speed, the simultaneous open condition or overlap results in increased filling and thus increased power, cooling of the valves and cylinders by means of air increases the filling. In theory, this can be derived from the equation $$\Delta V = \delta \cdot V_0 \cdot \Delta t$$

In the equation, $V_0$ is the volume of gas at 0° C. and the magnitude of coefficient $\delta$ is 1/273° C.$^{-1}$. This leads to a conclusion that, when heated to 273° C., the volume of gas expands to double, and the complete combustion of fuel with excess air produces cleaner exhaust gases. This decreases especially the amount of the oxides of nitrogen.

SUMMARY OF THE INVENTION

An object of the invention is to provide a solution for achieving the above-mentioned properties and at the same time for eliminating the drawbacks of the prior art. In order to achieve this object, a method of the invention is essentially characterized in that an air filling or the like is introduced into an inlet duct or the like prior to the start of an induction stroke in a manner that the air filling is first in the inlet duct immediately upstream of an inlet valve and that at least some of the air filling or the like is introduced into the cylinder space while the outlet valve is closed.

Thus, it is possible, although not necessary, that a method disclosed in the publication DE-OS 19 20 751 be applied as a part of the method of the invention in the sense that, at the start of an induction stroke, the inlet valve and outlet valve are simultaneously open for a while. Thus, a portion of the air filling or the like can be reserved for flushing the cylinder space and this portion is intended to discharge through at least one outlet valve. The at least one outlet valve is closed before the entire air filling is discharged, some of the air filling remaining in the cylinder space into which a fuel-and-air mixture is passed after the air filling. The air filling or a portion thereof is sucked to above a piston in the cylinder space and thus the explosive fuel-and-air mixture lies on top of this layer of air. At the moment of explosion, the layer of air on top of a piston in the cylinder space guarantees a complete combustion and, hence, cleaner exhaust gases.

The method is described in preferred embodiments particularly in terms of engines with two or more cylinders. It should be noted that the method is applicable to engines operating on either Otto, Diesel or Wankel principle.

The present invention relates also to an apparatus for improving the operation of an engine. In order to achieve the advantages described in connection with the method, the apparatus is essentially characterized by comprising means that are synchronized for filling the part of an inlet duct or the like immediately downstream of the inlet valve with an air filling prior to the start of an induction stroke.

An apparatus of the type mentioned before is described in U.S. Pat. No. 3,046,960. In such apparatus, a first flap fitted in an inlet duct for air and a second flap fitted in a duct for fuel-and-air mixture are opened and closed by a common actuating lever. However, with the apparatus in accordance with the state of the art, it is not possible to quickly start closing of the first flap at a certain lever position, when such closing is required for the proper functioning of the engine.

The invention will now be described in more detail in the following specification with reference made to the accompanying drawings. In the drawings:

DETAILED DESCRIPTION OF THE PREFERRED EMBODIMENT(S)

Figure 1:
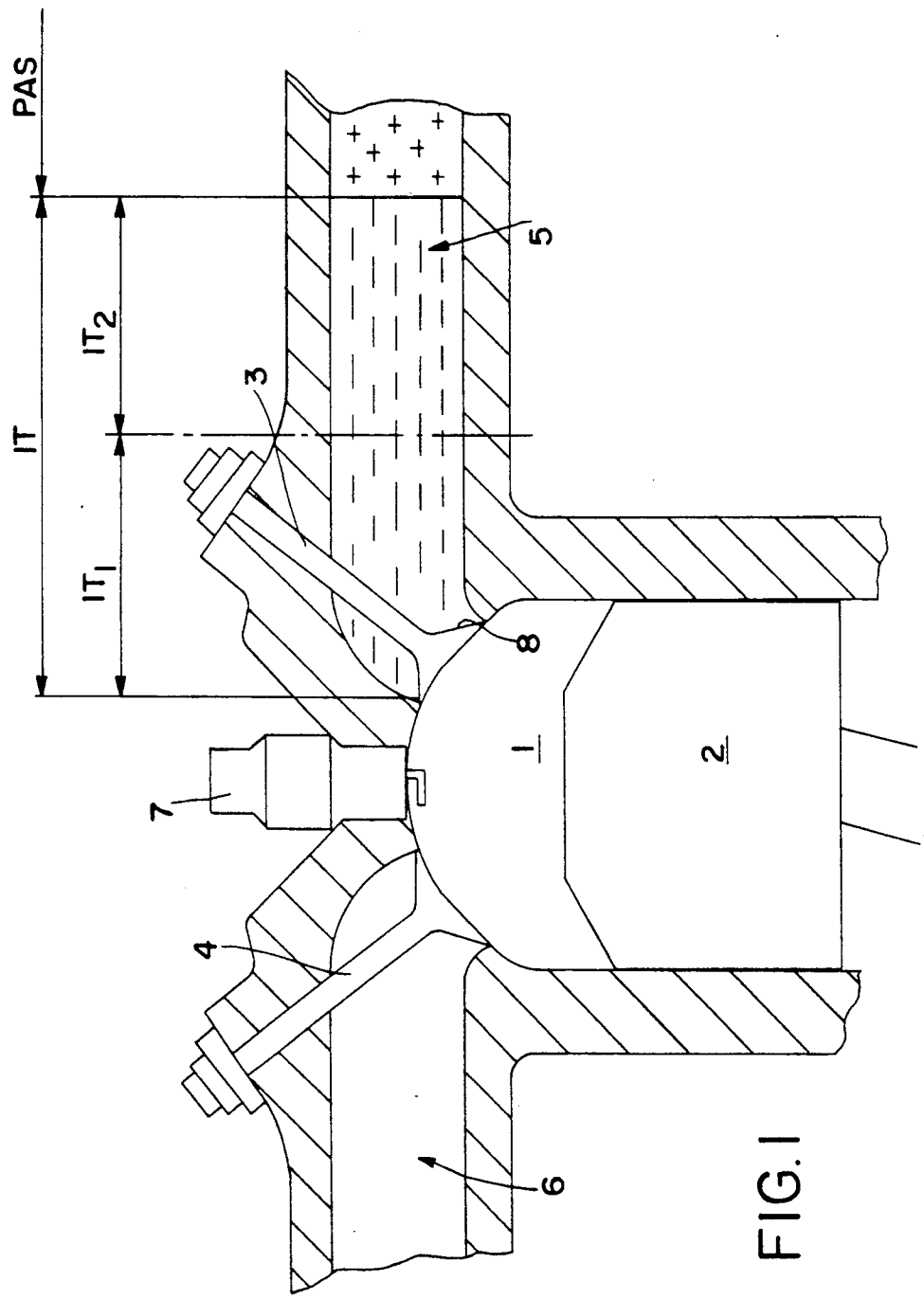
FIG. 1 shows schematically the basic idea of the invention.

An engine shown in FIG. 1 comprises a cylinder space 1, a piston 2 movable therein, an inlet valve 3, an outlet valve 4, an inlet duct 5 as well as an outlet duct 6. It is obvious that the engine includes normal mechanical elements for controlling the movement of valves and piston as well as an ignition system with a spark plug 7 as part of it. This overall aspect is not described in detail as it is not a part of the present invention and is well known to a person skilled in the art.

According to the basic idea of the present invention, the inlet duct 5 is filled with an air filling IT, indicated in FIG. 1 by — signs. This air filling starts at the back face 8 of the inlet valve clack and continues through a certain adjustable distance in the inlet duct 5. This air filling is followed by a fuel-and-air mixture PAS, indicated by + signs. According to one aspect of the invention, the forward portion of air filling or a first portion $IT_1$ of air filling IT issuing from inlet valve 3 can be used for flushing the cylinder space, as described later in more detail. The second portion $IT_2$ of air filling IT further down in inlet duct 5 is adapted to be introduced into cylinder space 1 only after the outlet valve 4 has closed at the start of an induction stroke. In any case, the provision of through-flushing is optional in terms of the invention. Thus, the entire air filling IT can be introduced into the cylinder space while the outlet valve is closed.

It should be appreciated that the term PAS is intended to cover other corresponding gases or gas mixtures suitable for the same purpose. All gas mixtures capable of achieving the characterizing features set forth in the preamble section of this specification can be employed. It is naturally obvious that such a gas mixture must contain oxygen in a certain proportion.

Figure 2A:
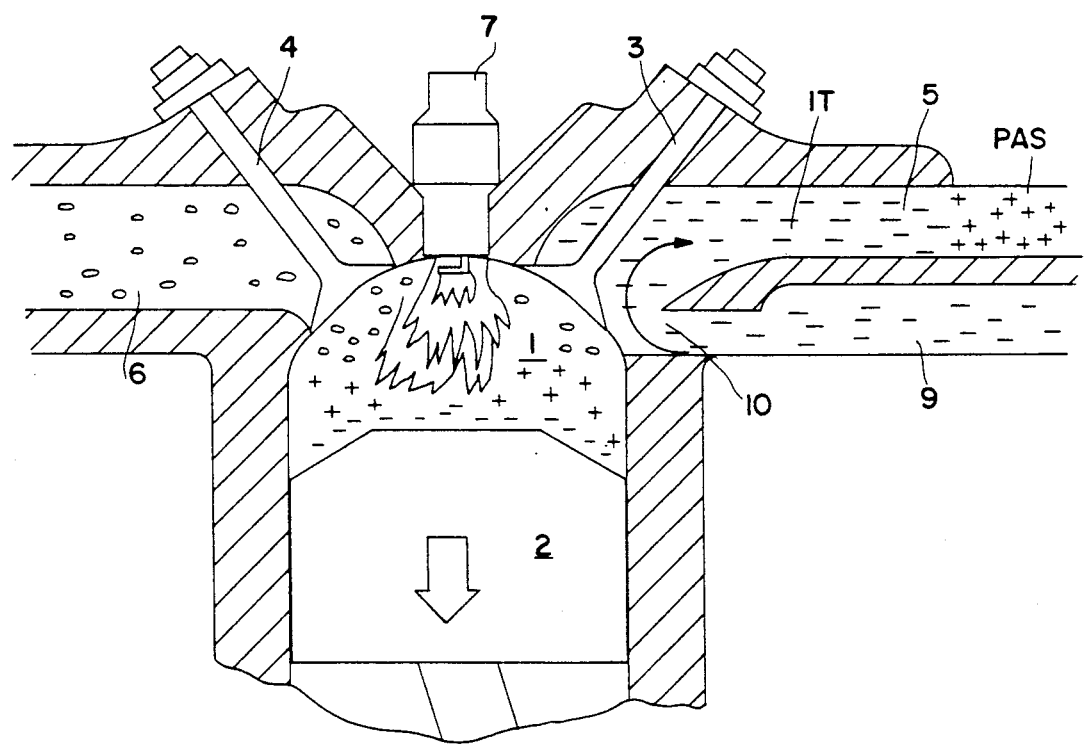
FIGS. 2a–c show the most essential stages of the present method in a piston engine operating on four-stroke principle.
Figure 2B:
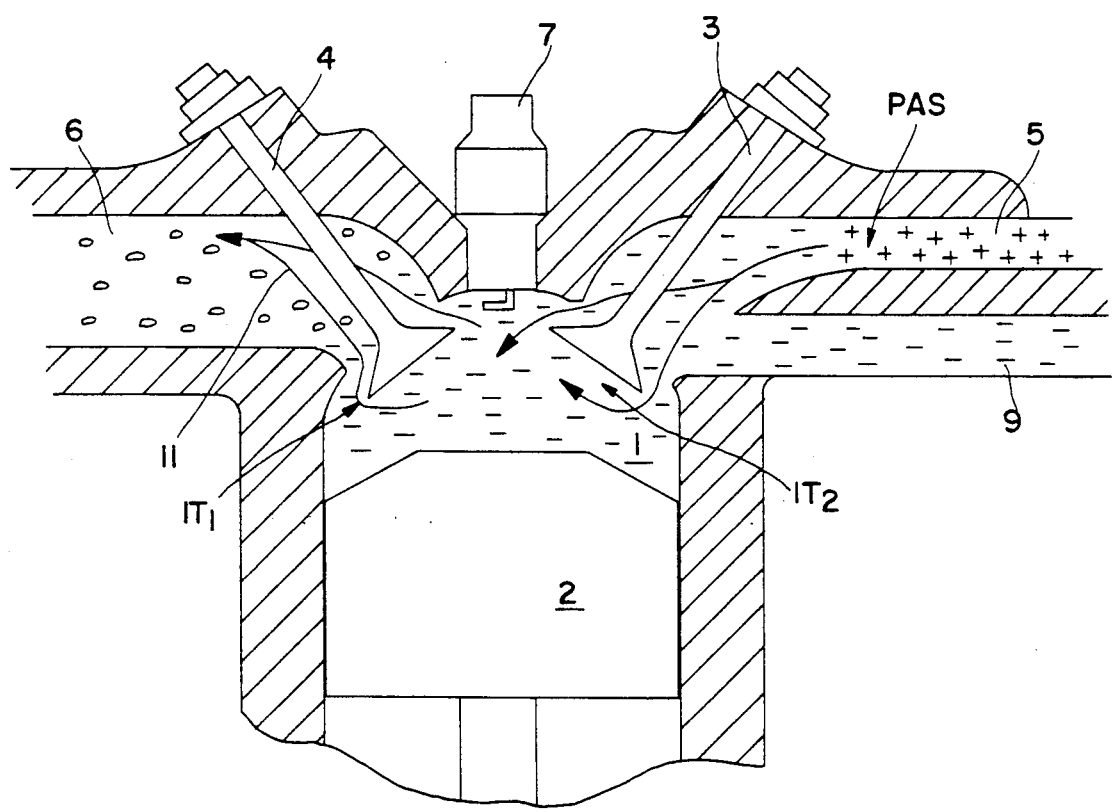
Figure 2C:
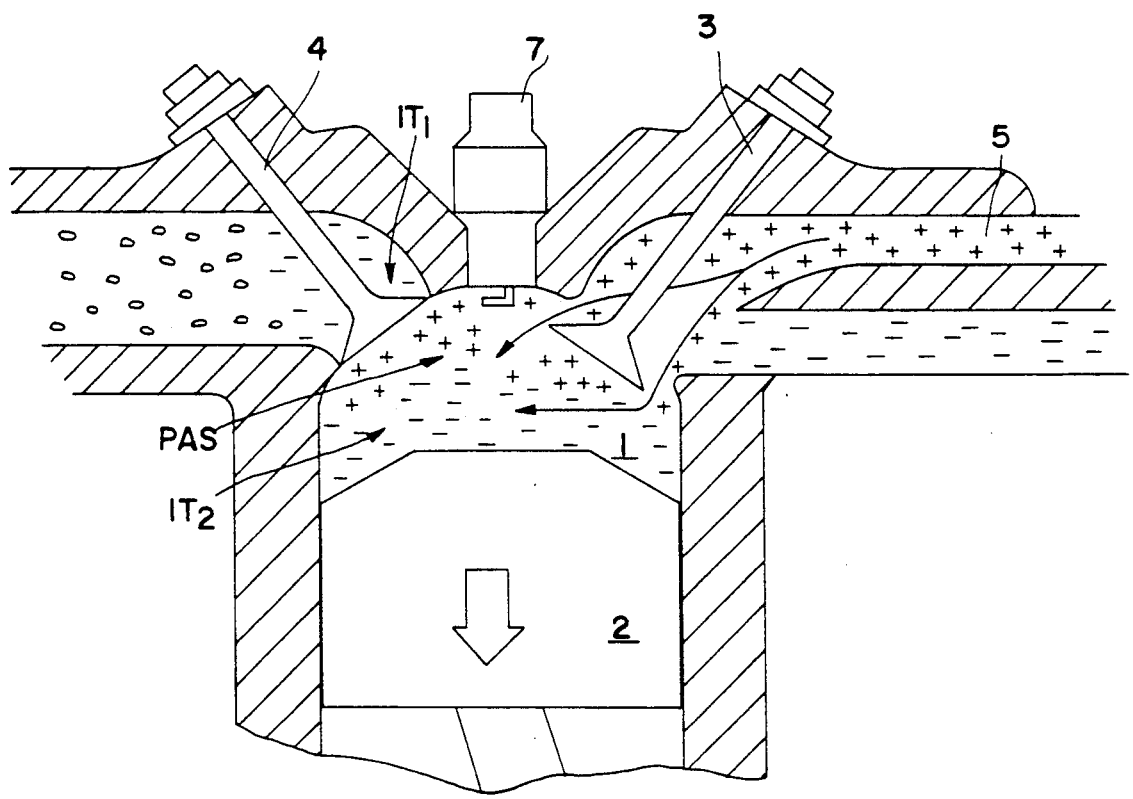

FIG. 2a illustrates the formation of air filling IT in the inlet duct 5 during a power stroke. Thus, air is supplied from a filling duct 9 connected with inlet duct 5 through a port 10 between inlet duct 5 and filling duct 9, which port can be located near inlet valve 3 as shown in FIGS. 2a-c. The air filling IT displaces the fuel-and-air mixture PAS away from the inlet valve further down inlet duct 5, the fuel-and-air mixture having extended all the way to inlet valve 3 after the preceding induction stroke. Following a power stroke, and especially in four-stroke engines, at the end of an exhaust stroke, whereby the piston is at or near the top dead center, there will be the situation shown in FIG. 2b. This situation is an overlap situation with inlet valve 3 and outlet valve 4 simultaneously open for a while, whereby the burned gases, indicated by circles, discharge into outlet duct 6 as indicated by an arrow 11. At the same time, while the inlet valve is open, a portion $IT_1$ of air filling IT discharges from inlet duct 5 into cylinder space 1 so that this portion exits together with the burned gases into outlet duct 6.

The situation shown in FIG. 2c is the starting stage of an induction stroke, with outlet valve 4 having closed and a portion $IT_2$ of air filling IT lying on the top surface of piston 2 and, after that, the fuel mixture having filled the rest of cylinder space 1. After the closing of inlet valve 3 and following a compression stroke, there is again the situation shown in FIG. 2a after the fuel mixture extending to inlet valve has been displaced to the position shown in FIG. 2a.

At the moment of explosion, in cylinder space 1 on top of piston 2 there is an air filling IT, either the entire air filling or a portion thereof, as long as the simultaneous opening of inlet valve 3 and outlet valve 4 is employed during an exhaust stroke as indicated in FIG. 2.

It is obvious that in single-piston engines the delivery of air filling is simple, for example, a control acquired from the rotation of a crankshaft or from the rotation of a member carried thereby can be used to open a valve communicating with filling duct 9. In addition to the normal vacuum of an intake manifold, the air filling can in some cases be obtained by using an air pump or a supercharger.

Figure 3:
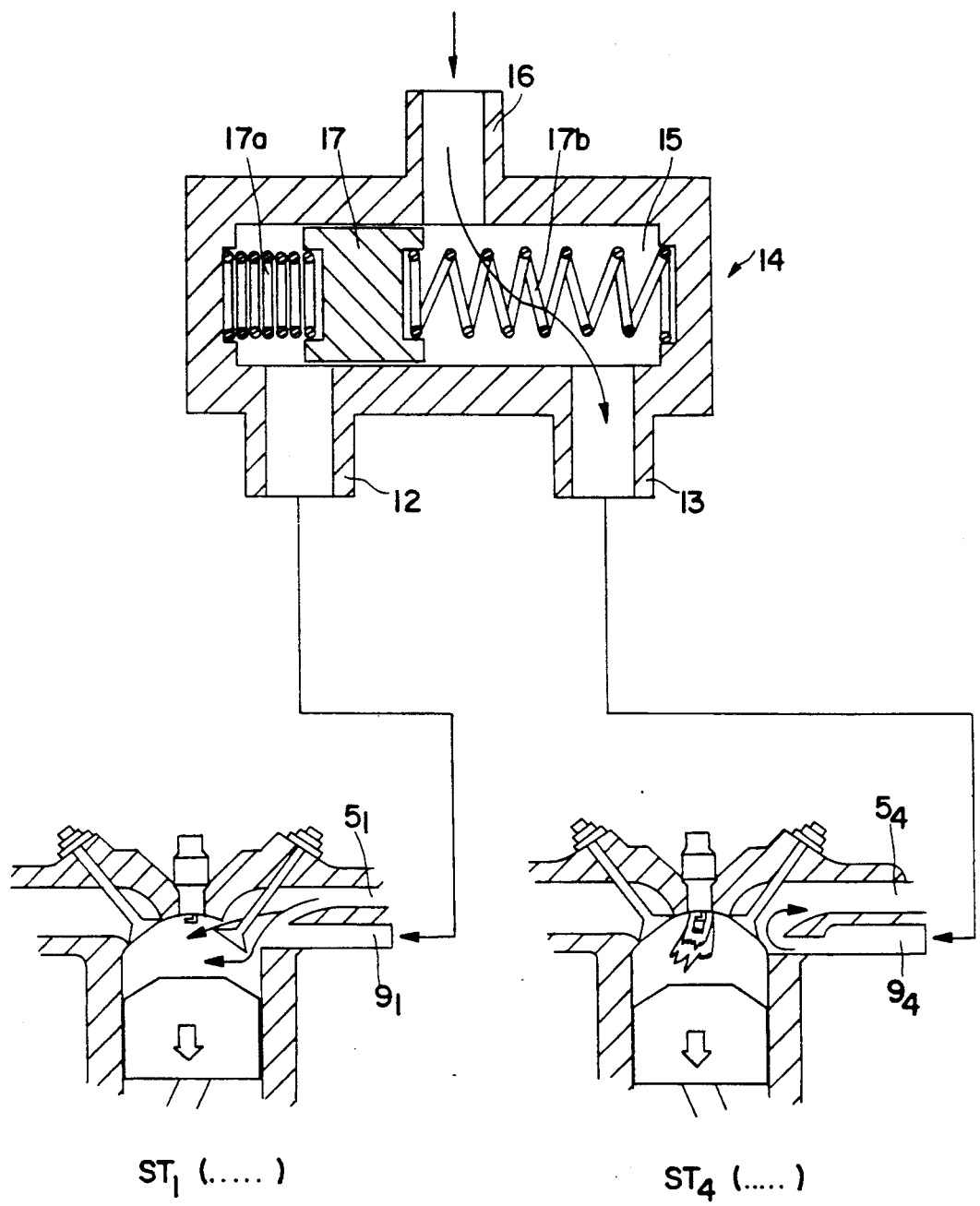
FIGS. 3–5 are views of several embodiments of air filling distributor means applicable in connection with an engine comprising two or more cylinder spaces.

FIG. 3 shows one way of applying an engine provided with two, four, six etc. cylinder spaces for practicing the method. Thus, those two (for example, $ST_1$ and $ST_4$) of the cylinder spaces of an engine are always selected, which are simultaneously doing an induction stroke ($ST_1$) and a power stroke ($ST_4$). A distributor means 14 provided with two outlets 12 and 13 is connected to filling ducts $9_1$ and $9_4$ communicating with respective cylinder spaces. The distributor means 14 comprises an elongated chamber space 15, preferably of a circular cross-section, the outlet connections 12 and 13 as well as an air filling inlet connection 16 being in communication therewith. In the chamber space 15 a longitudinally movable clack member 17 is fitted for always closing that outlet connection (outlet connection 12 in FIG. 3), whose corresponding cylinder space is in induction stroke. This is due to the fact that at this point there is a vacuum in the inlet duct that carries clack member 17 into alignment with the corresponding outlet connection 12, the clack member being carried in chamber space 15 by centering springs 17a, 17b. Thus, from inlet connection 16 there opens through chamber space 15 an access to outlet connection 13 and, hence, an air filling IT can develop in an inlet duct $5_4$. Between the movements of air filling and while the engine is not running, the clack member 17 is in alignment with inlet connection 16 and closes it.

Figure 4:
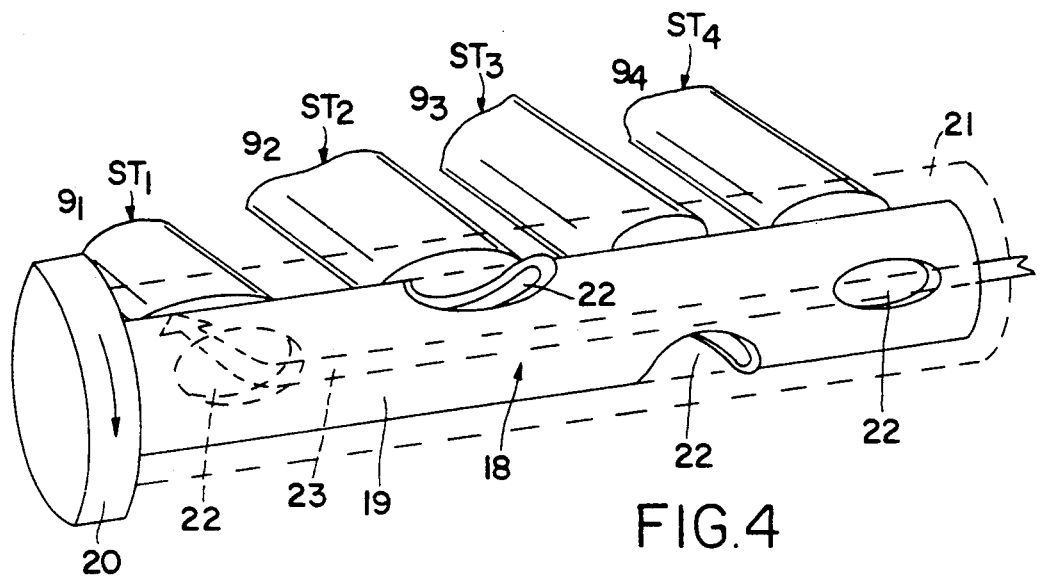

FIG. 4 shows another embodiment of the distributor means.

A distributor means 18 includes a tubular element 19, coupled to be rotatable around its longitudinal axis in synchronization with the speed of rotation of an engine by means of a member 20, which is shown as reference. A person skilled in the art is well aware of how to achieve such synchronization and how to construct member 20, so this is not explained further in this context. Tube 19 is fitted inside a protective pipe 21, shown with dash-and-dot lines and provided with communicating ports into filling ducts $9_1$-$9_4$ connected to cylinder spaces $ST_1$-$ST_4$. Tube 19 is further provided with openings 22, corresponding to the number of cylinder spaces and arranged on the periphery of tube 19 in such a manner that always one opening can be in communication with the filling connection of one cylinder space. Furthermore, the openings are arranged at regular mutual distances on the outer periphery of tube 19. Thus, as tube 19 is rotating around its longitudinal axis, an air flow (arrow 23), produced by a vacuum prevailing in the intake manifold for developing an air filling IT in an inlet duct connected with each cylinder space, passes through a corresponding opening 22 into a corresponding filling duct $9_1$-$9_4$ in a synchronized fashion during the compression stroke of each cylinder.

Figure 5:
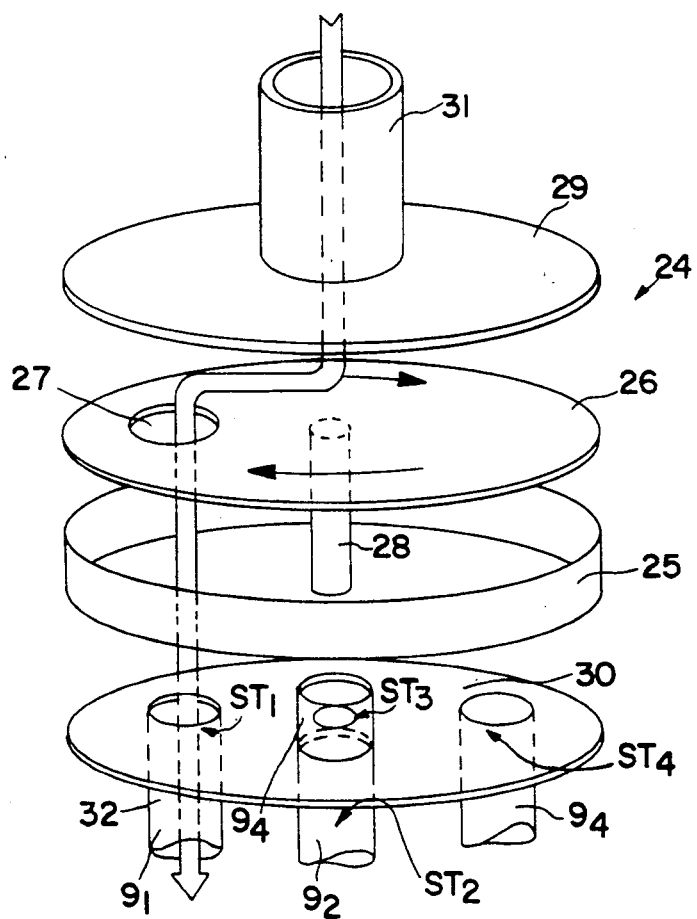

FIG. 5 illustrates a still further possible embodiment of an air distributor. This air distributor 24 comprises a substantially annular frame jacket 25, a distributing disk 26 fitted inside the jacket and provided with a distributing hole 27. Distributing disk 26 is adapted to rotate around an axle 28 which is aligned perpendicularly to the radius of the annular jacket. The ends of annular jacket 25 are closed on the one hand by an inlet gable 29 and on the other hand by a distribution gable 30. The inlet gable 29 is provided with a filling air inlet connection 31 and the distribution gable 30 is provided with a number of outlet connections 32 corresponding to the number of cylinder spaces and communicating with filling ducts $9_1$–$9_4$ and mounted co-radially relative to the center of distribution gable 30, so that the hole 27 rotating on a circular line with a corresponding radius will be aligned with the outlet connections. When a vacuum prevailing in the intake manifold is used to supply air into the space of distributor 24 defined by frame jacket 25, distributing disk 26 and inlet gable 29 and with hole 27 rotating in alignment with inlet gable 30, the air flow always shifts to that outlet connection 32 which is in alignment with hole 27. This operation is effected in a synchronized fashion.

Figure 6:
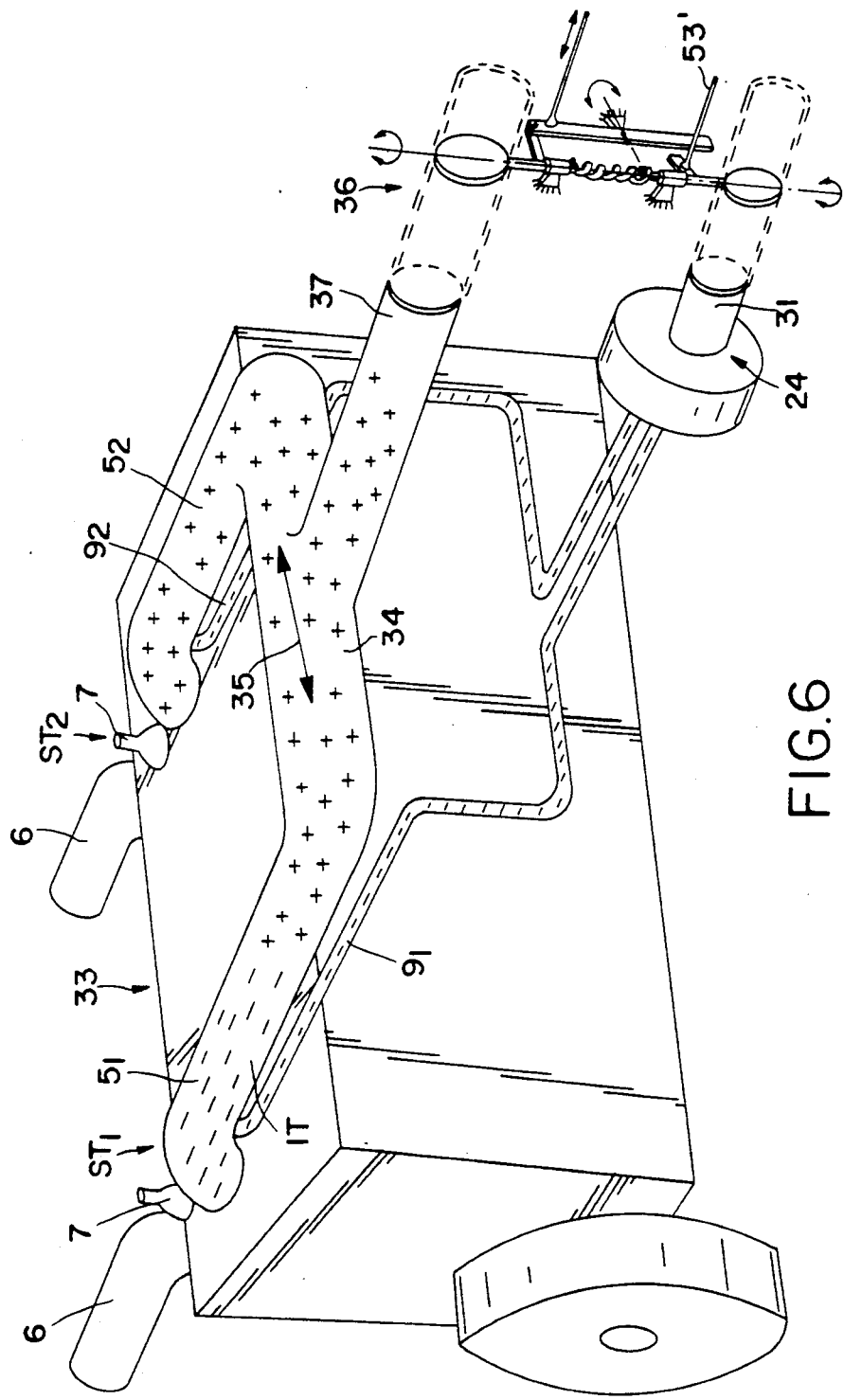
FIG. 6 is a perspective view of an engine which is equipped with two cylinder spaces and fitted with a distributor means and an adjustment mechanism (FIG. 6a) for adjusting the air filling in proportion to the speed of rotation of an engine and FIG. 7 is a view of the adaptation of a method of the invention to a two-stroke engine.
Figure 6A:
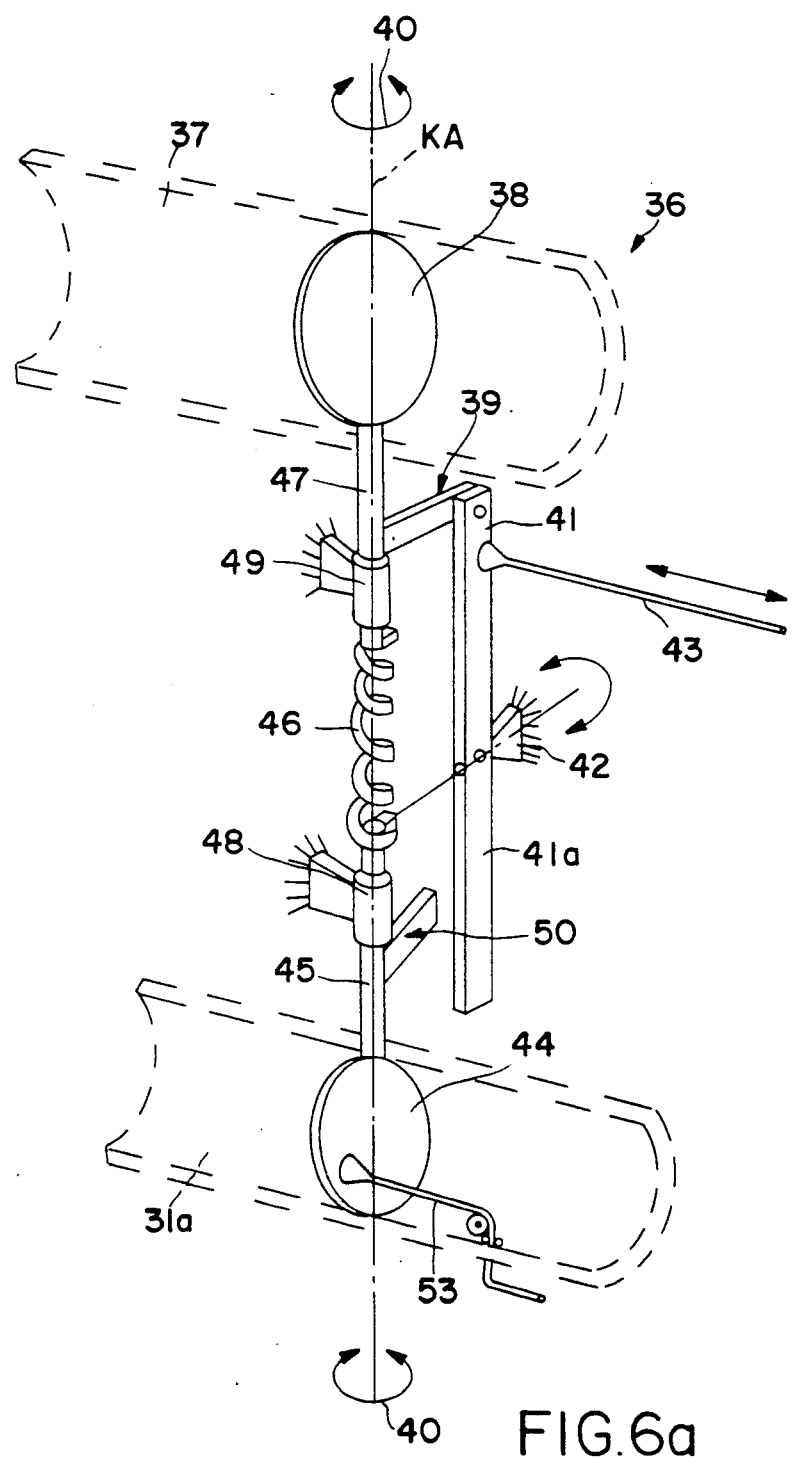

FIG. 6 is a perspective view of an engine 33 provided with two cylinder spaces. A distributor 24 is similar to that shown in FIG. 5 although constructed to be suitable for two cylinder spaces $ST_1$ and $ST_2$. The filling ducts $9_1$ and $9_2$ are mounted in communication with respective inlet ducts $5_1$ and $5_2$ to provide a construction basically similar to that shown in FIGS. 2a–c. FIG. 6 depicts one of the advantages gained by the present invention, namely the air filling IT creates in the distribution duct 34 of inlet ducts $5_1$ and $5_2$ a reciprocating motion shown by an arrow 35 for further enhancing the mixing of fuel-and-air mixture. The enlarged partial FIG. 6a accompanying FIG. 6 further illustrates one embodiment of a mechanism for adjusting the amount of air filling 36. Fitted in a fuel-and-air mixture inlet duct 37 is a fuel-and-air mixture adjustment flap 38 or a similar member. This flap is used to control the speed of rotation of an engine. The adjustment flap is provided with a leverage 39 for turning the flap around an axis KA extending in the direction of the flap diameter as shown by an arrow 40 whenever the operating lever 41 of flap 38, journalled (at 42) rotatably relative to an engine block, is acted upon through the intermediary of a cable 43 or the like. Similarly, a duct 31a communicating with inlet connection 31 of distributor 24 is fitted with an adjustment flap 44 or the like for adjusting the amount of air filling. The turning axle 45 of flap 44 or the like is connected by an intermediate spring 46 to the turning axle 47 of flap 38. The turning axles 45 and 47 are journalled upon sleeves 48 and 49 secured to the engine block. The turning axle 45 of flap 44 is fitted with a leverage 50. The extension 41a of an operating lever 41 is adapted to act on leverage 50 as shown by a diagram I. The flap 44 or its turning axle 45 is fitted with a cable 53 (53') or the like for keeping flap 44 closed during a cold start.

Figure 8:
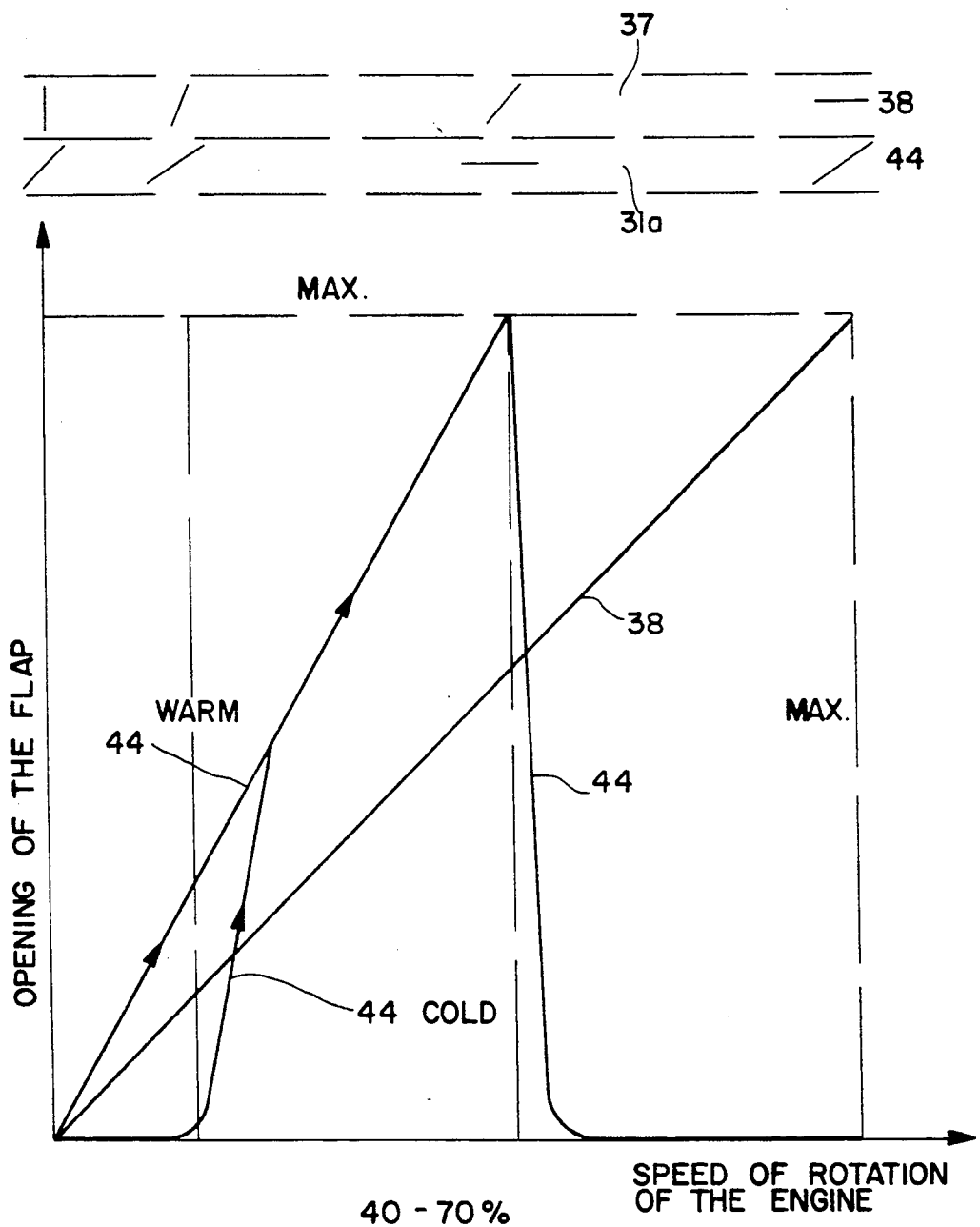
FIG. 8 illustrates the opening of a flap as a function of engine speed rotation.

FIG. 8 illustrates the opening of a flap as a function of the speed of rotation of an engine. The diagram shows that flap 38 as the speed of rotation of an engine increases uniformly and the opening of flap 44 is linked with this opening movement in a manner that, with a cold start on a certain speed range of rotation, flap 44 begins to open after the detachment of cable 53 and as the intermediate spring 46 transmits the turning of axle 47 to the axle 45 of flap 44. Thus, flap 44 opens to its maximum open position as the speed range of an engine is about 40–70% of its maximum (50% in FIG. 8). After this speed range flap 44 closes very quickly and remains closed on the top speeds of rotation of an engine. This operation is effected by means of the extension 41a of operating lever 41 and the leverage 50 of adjustment flap 44 which, upon shifting said operating lever 41 for producing top speed of rotation, encounter each other and this encounter results in the closing of flap 44. When operating lever 41 is returned to its initial position, flap 38 closes and flap 44 remains in its closed position by the action of the intermediate spring. FIG. 8 depicts a corresponding operation also for flaps 38 and 44, so that the relative position of flaps 38 and 44 is sketched on respective speed ranges of an engine in alignment with dash-and-dot lines describing ducts 31a and 37. In the example, flap 44 forms with the longitudinal axis of duct 31 a 45° angle in its closed position and flap 38 is perpendicular to the longitudinal axis of duct 37 in its closed position. Thus, the turning motion of flap 44 to a maximum position is 45° (closing at half-way point of maximum speed of rotation) and the turning motion of flap 38 to a maximum position is 80°–90°. When the engine is warm, the opening of flap 44 can be synchronized by means of an intermediate spring 46 in direct proportion to the speed of rotation of an engine also on idle run and low speeds of rotation. This is effected by means of the above adjustment mechanism 16. It is obvious that the design of such adjustment mechanism can be caried considerably within the scope of alternative constructions self-evident for a person skilled in the art. Flap 44 is fully open, for example, when the speed of rotation of an engine is half of the maximum and it closes when the speed of rotation reaches the maximum. It is clear that the operation of an adjustment flap can also be effected by a manual control which is different from the above operation. In an engine of the present invention, a normal carburator can also be replaced with continuous injection or central injection. The engine can also be provided with a supercharger. It is obvious from the above that the engine can include an even or odd number of cylinders.

Figure 7:
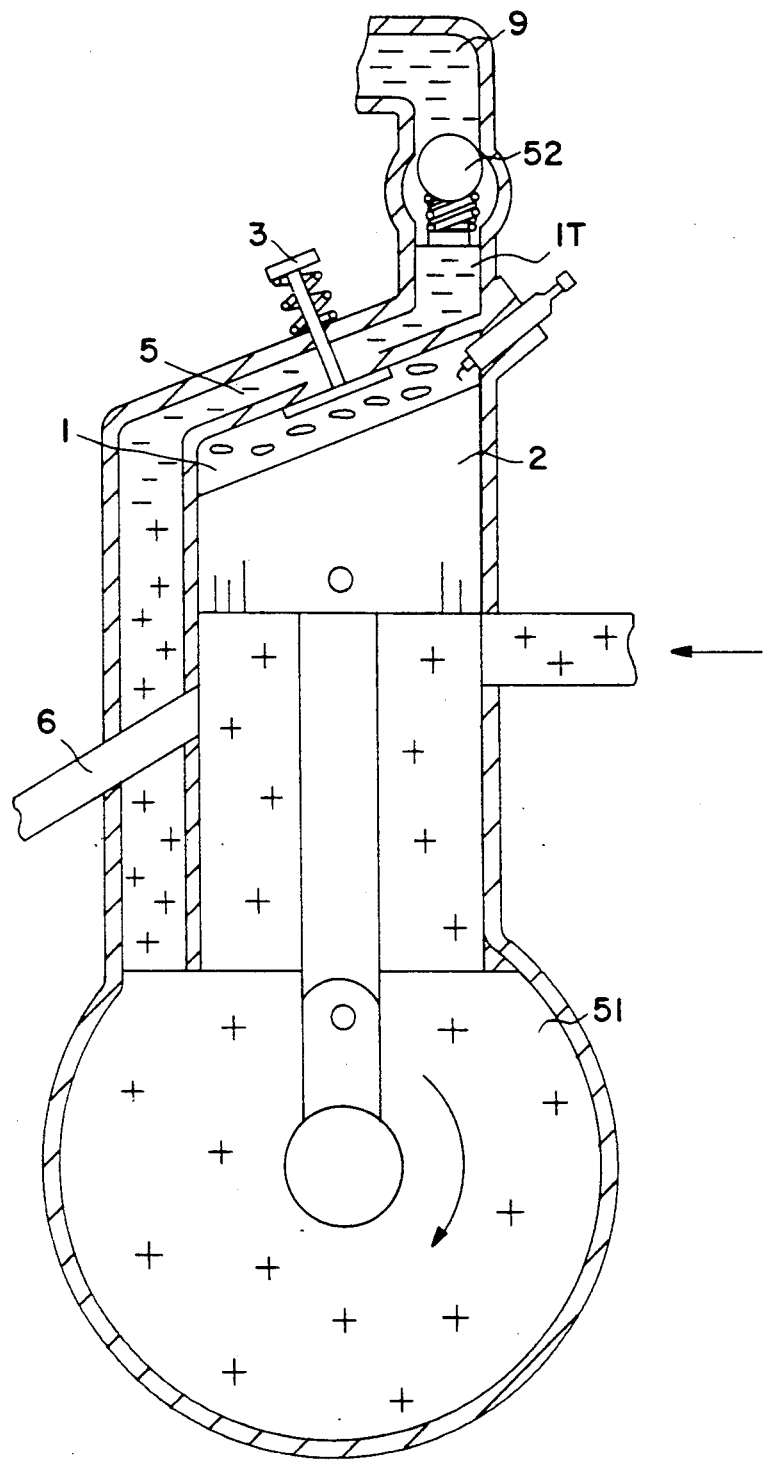

FIG. 7 illustrates the application of a method of the invention to a two-stroke engine. A piston 2 compresses through a crankcase 51 into an inlet duct a mixture of fuel and air. An inlet duct 5 communicates by way of a valve 52 with a filling duct, adapted to operate so as to fill the forward section of the inlet duct with an air filling IT. The air filling displaces the fuel-and-air mixture which has arrived in inlet duct 5 from crankcase 51. Valve 52 can be a spring-loaded needle valve or the like allowing the flow of air filling IT from filling duct 9 into inlet duct 5 but not in the opposite direction.

The method and apparatus of the invention are capable of providing an adjustable lean mixture engine. The application of this method requires sufficiently long inlet ducts in an engine so as to reserve a sufficient amount of air in inlet ducts at all operating stages of an engine. The cover of an engine can be either inclined, semi-spherical, shaped as a trussed roof or a vat. The outlet valve is preferably positioned higher than the inlet valve and the spark plug at the highest point of a cylinder space. A condition for these is of course that the cylinder space is adapted to extend in vertical direction. The method is capable of providing a reliably running engine which, at the moment of explosion, contains a readily ignitable and lean mixture which in turn produces cleaner exhaust gases and possibly makes even the use of a catalyzer unnecessary. A fuel-and-air mixture received in the engine is uniform with a reciprocating mixing motion developing in inlet ducts 5 as well as in their distribution duct (component 35 in FIG. 6). Thus, operation of the carburator and especially a flow therethrough is smooth. In addition, it is possible to employ a higher compression ratio in the engine.

We claim:

1. A method of improving the operation of an engine, said engine including a cylinder space, a piston movable therein, at least one inlet valve having an inlet duct associated therewith, and at least one outlet valve having an outlet duct associated therewith, said method comprising:

providing an air filling in said inlet duct upstream of said inlet valve(s);

introducing an initial portion of said air filling into said cylinder space while said outlet valve is open whereby said initial portion of air filling flushes said cylinder space and exits into said outlet duct through the open outlet valve(s);

closing said outlet valve(s) while continuing introduction of said air filling in said cylinder space; and introducing an air fuel mixture into said cylinder space through the same inlet duct(s) and inlet valve(s) through which the air filling has passed in being introduced into the cylinder, resulting a fuel charge stratified atop of the retained air filling wherein said air filling is introduced into said inlet duct by displacement of said air-fuel mixture within said inlet duct in a direction away from said inlet valve.

2. A method according to claim 1, wherein said engine comprises at least two cylinder spaces and wherein said air filling is being introduced into an inlet duct of each cylinder space through a communicating filling duct by means of a distributor including a control member adapted for passing air filling into each filling duct in a synchronized manner.

3. A method according to claim 2, wherein the operation of said control member is controlled during the induction stroke of the cylinder space in such a manner that the connection of cylinder spaces coupled pairwise with the same distributor is closed off, by said control member during each induction stroke for opening a connection to the inlet duct of another cylinder space, in which prevails a compression stroke.

4. A method according to claim 2, wherein the operation of said control member is controlled by means of a transmission obtained mechanically from the speed of rotation of a shaft rotated by said piston of said engine.

5. A method according to claim 1, wherein the supply of air filling is closed off at a speed of rotation of a shaft rotated by said piston of said engine, which is between 40% and 70% of maximum speed of rotation of said shaft.

6. A method of improving the operation of an engine, said engine including a cylinder space, a piston movable therein, at least one inlet valve having an inlet duct associated therewith, and at least one outlet valve having an outlet duct associated therewith, said method comprising:

providing an air filling entirely in said inlet duct upstream of said inlet valve(s);

introducing said air filling into said cylinder space, at least a portion of said air filling being introduced while said outlet valve is closed;

retaining said at least portion of said air filling in said cylinder space prior to introduction of an air-fuel mixture; and introducing an air fuel mixture into said cylinder space through the same inlet duct(s) and inlet valve(s) through which the air filling has passed in being introduced into the cylinder, resulting in a fuel charge stratified atop of the retained air filling wherein said air filling is introduced into said inlet duct by displacement of said air-fuel mixture within said inlet duct in a direction away from said inlet valve.

7. A method according to claim 6, wherein air filling is introduced into the inlet duct from a filling duct which connects with said inlet duct substantially at the inlet valve.

8. A method of improving the operation of an engine, said engine including a cylinder space, a piston movable therein, at least one inlet valve having an inlet duct associated therewith, and at least one outlet valve having an outlet duct associated therewith, said method comprising:

providing an air filling in said inlet duct upstream of said inlet valve(s);

introducing an initial portion of said air filling into said cylinder space while said outlet valve is open whereby said initial portion of air filling flushes said cylinder space and exits into said outlet duct through the open outlet valve(s);

closing said outlet valve(s) while continuing introduction of said air filling in said cylinder space; and introducing an air fuel mixture into said cylinder space through the same inlet duct(s) and inlet valve(s) through which the air filling has passed in being introduced into the cylinder, resulting in a fuel charge stratified atop of the retained air filling, wherein said engine comprises at least two cylinder spaces and wherein said air filling is being introduced into an inlet duct of each cylinder space through a communicating filling duct by means of a distributor including a control member adapted for passing air filling into each filling duct in a synchronized manner; and wherein the flow of air filling into said inlet duct is controlled by an adjustment means, said adjustment means including a first regulating member fitted in a duct communicating with an inlet connection of said distributor; a second regulating member fitted in an upstream portion of said inlet duct, and means operatively interconnecting said first and second regulating members and being adapted for transmitting movement of said second regulating member to said first regulating member, whereby adjusting effect imparted upon said second regulating member is transferred as a corresponding adjusting effect to said first regulating member.

9. A method according to claim 8, wherein said first regulating member is closed at a rotational speed of a shaft rotated by said piston of said engine which is between 40% and 70% of maximum speed of rotation of said shaft.

10. A method according to claim 8 further comprising means for holding said first regulating member closed during a cold start.

11. An apparatus for improving the operation of an engine, said engine including at least two cylinder spaces, each cylinder space comprising a piston, at least one inlet valve, at least one outlet valve, an inlet duct for fuel-and-air mixture associated with said inlet valve, and an outlet duct for burned gases associated with said outlet valve, said apparatus also including an air introducing means for filling a section of said inlet duct immediately upstream of said inlet valve with an air filling prior to the start of an induction stroke, said air introducing means comprising:

a filling duct for each said cylinder space, each respective filling duct being connectable to said respective inlet duct at said respective inlet valve;

said filling ducts being in communication with a distributor adapted for introducing said air filling into said filling ducts in a manner synchronized with the operation of said engine;

adjusting means for controlling the amount of the air filling, said adjusting means being operatively connected with said distributor, and including a first regulating member fitted in a duct communicating with an inlet connection of said distributor, a second regulating member fitted in an upstream portion of said inlet duct, and means operatively interconnecting said first and second regulating members, said interconnecting means being adapted for transmitting movement of said second regulating member to said first regulating member, whereby adjusting effect imparted upon said second regulating member is transferred as a corresponding adjusting effect to said first regulating member.

12. An apparatus for improving the operation of an engine, said engine including at least two cylinder spaces each cylinder space comprising a piston, at least one inlet valve, at least one outlet valve, an inlet duct for fuel-and-air mixture associated with said inlet valve and an outlet duct for burned gases associated with said outlet valve, said apparatus also including an air introducing means for filling a section of said inlet duct immediately upstream of said inlet valve with an air filling prior to the start of an induction stroke, said air introducing means comprising:

a filling duct for each said cylinder space, each respective filling duct being connectable to said respective inlet duct for fuel-and-air mixture at said respective inlet valve;

said filling ducts being in communication with a distributor adapted for introducing said air filling into said filling ducts in a manner synchronized with the operation of said engine;

means for adjusting the amount of the air filling operatively connected with said distributor, said adjusting means including a first regulating member fitted in a duct communicating with an inlet connection of said distributor; a second regulating member fitted in an upstream portion of said inlet duct; and means for connecting said first and second regulating member and adapted for controlling movement of said first regulating member according to the movements of said second regulating member;

said connecting means including an intermediate spring for linking the axis of said first and second regulating member and an operating lever, said operating lever being acted upon by means of a cable or the like for imparting the adjusting effect to said second regulating member, a substantially parallel effect or action being transmitted to the first regulating member by means of said intermediate spring;

wherein in a certain operating lever position, a member of said operating lever is adapted to shift said first regulating member quickly back to a closing position against the force of said intermediate spring.

13. An apparatus according to claim 12, wherein said first regulating member is provided with a closing member for retaining said first regulating member in a closed position during a cold start.

14. An apparatus according to claim 12, wherein said cylinder spaces are pairwise coupled with a common distributor, said distributor being provided with two outlets connected to said filling ducts, a chamber space and a control member movable therein, said control member being adapted through the vacuum resulting from the induction stroke to alternately close outlets for supplying air filling from the distributor's inlet connection through the opened outlet of said chamber space into the inlet duct of that cylinder space wherein prevails a compression stroke.

15. An apparatus according to claim 12, wherein said distributor includes a tubular member rotatable around its longitudinal axis by rotating means according to the speed of rotation of the engine, a protective pipe which is provided with connecting ports leading into said filling ducts and which surrounds said tubular member and openings whose number corresponds to that of said cylinder spaces and which are distributed in said tubular member in such a manner that at least one of said openings at a time, is in communication with a corresponding connecting port in a manner synchronized with the operation of the engine.

16. An apparatus according to claim 12, wherein said distributor comprises a distributing disk provided with a distributing hole and adapted to rotate between an inlet end and an outlet end so as to open a communication path to each outlet connection associated with the outlet end and leading to a respective filling duct, said communication path opening alternately to each outlet connection from an inlet connection at said inlet end.

* * * * *